US010549810B2

(12) United States Patent
Block et al.

(10) Patent No.: US 10,549,810 B2
(45) Date of Patent: Feb. 4, 2020

(54) MOTORIZED COLLAPSIBLE SCOOTER FOR USE AS AN ASSISTIVE MOBILITY DEVICE

(71) Applicants: Colleen Block, Victoria (CA); Emanuela Bourne, Victoria (CA)

(72) Inventors: Colleen Block, Victoria (CA); Emanuela Bourne, Victoria (CA)

( * ) Notice: Subject to any disclaimer, the term of this patent is extended or adjusted under 35 U.S.C. 154(b) by 0 days.

(21) Appl. No.: 16/137,443

(22) Filed: Sep. 20, 2018

(65) Prior Publication Data
US 2019/0023347 A1 Jan. 24, 2019

Related U.S. Application Data

(63) Continuation-in-part of application No. PCT/CA2017/000063, filed on Mar. 17, 2017.
(Continued)

(30) Foreign Application Priority Data

Mar. 17, 2017 (WO) ................ PCT/CA2017/000063

(51) Int. Cl.
B62K 15/00 (2006.01)
B62J 1/08 (2006.01)
(Continued)

(52) U.S. Cl.
CPC .............. B62K 15/008 (2013.01); B62J 1/08 (2013.01); B62J 99/00 (2013.01); B62K 5/027 (2013.01);
(Continued)

(58) Field of Classification Search
CPC .... B62K 15/008; B62K 15/006; B62K 5/027; B62K 5/06
See application file for complete search history.

(56) References Cited

U.S. PATENT DOCUMENTS 4,824,130 A * 4/1989 Chiu ........................ B62K 5/00
280/239
6,854,551 B2 * 2/2005 Wisecarver .......... B62D 31/006
180/208
(Continued)

FOREIGN PATENT DOCUMENTS

CN 204473012 U 7/2015

OTHER PUBLICATIONS

Canadian International Searching Authority, International Search Report and Written Opinion dated Jul. 20, 2017, International Patent Application No. PCT/CA2017000063, 11 Pages.

Primary Examiner — James A English
(74) Attorney, Agent, or Firm — Baumgartner Patent Law; Marc Baumgartner

(57) ABSTRACT

A motorized scooter is provided for use as an assistive mobility aid. The motorized scooter is easily folded for storage or transport. It comprises a front wheel in rotatably engagement with a steering tube, the front wheel including a hub and spokes extending therefrom, an electric motor housed in the hub and in mechanical communication with a cog, the cog engaging the spokes; a handle bar distally attached to the steering tube; a framework, the framework including a plurality of tubes that are in one or more of pivotal or slidable relation; a seat post slidably mounted on the framework; a seat attached to the seat post; and a pair of rear wheels in rotatable engagement with the framework.

19 Claims, 10 Drawing Sheets

Related U.S. Application Data

(60) Provisional application No. 62/310,740, filed on Mar. 20, 2016.

(51) Int. Cl.
   *B62J 99/00* (2020.01)
   *B62K 5/027* (2013.01)
   *B62K 5/06* (2006.01)
   *B62L 1/02* (2006.01)
   *B62M 7/12* (2006.01)

(52) U.S. Cl.
   CPC ..................... *B62K 5/06* (2013.01); *B62L 1/02* (2013.01); *B62M 7/12* (2013.01); *B62J 2099/0013* (2013.01)

(56) References Cited

U.S. PATENT DOCUMENTS

| | | |
|---|---|---|
| 7,207,407 B2 | 4/2007 | Huber |
| 7,654,356 B2 | 2/2010 | Wu |
| 7,967,095 B2 | 6/2011 | Kosco |
| 8,388,006 B2 | 3/2013 | Wu |
| 8,388,014 B2 | 3/2013 | Wu |
| 8,413,753 B2 | 4/2013 | Wu |
| 8,714,292 B1 | 5/2014 | Wong |
| 8,714,576 B2 * | 5/2014 | Moldestad ............. B62K 21/00 280/240 |
| 8,746,730 B2 | 6/2014 | Wu |
| 8,978,806 B2 | 3/2015 | Zhang |
| 2002/0163164 A1 * | 11/2002 | Shapiro .................... B62K 9/00 280/651 |
| 2013/0341884 A1 * | 12/2013 | Raphael .................... B62K 5/02 280/259 |
| 2015/0060176 A1 * | 3/2015 | Paick ....................... B62M 6/60 180/208 |
| 2016/0016629 A1 * | 1/2016 | Wang ..................... B62K 15/00 180/208 |
| 2016/0221629 A1 * | 8/2016 | Behar ....................... B62J 1/28 |
| 2016/0297495 A1 * | 10/2016 | He ........................ B62K 15/008 |
| 2018/0065703 A1 * | 3/2018 | Li ............................. B62J 11/00 |

\* cited by examiner

MOTORIZED COLLAPSIBLE SCOOTER FOR USE AS AN ASSISTIVE MOBILITY DEVICE

CROSS REFERENCE TO RELATED APPLICATIONS

The present application is a continuation-in-part of International Patent Application No. PCT/CA2017/000063, filed Mar. 17, 2017, which designated the U.S. and claims the benefit of priority to U.S. Provisional Application No. 62/310,740, filed Mar. 20, 2016, entitled MOTORIZED COLLAPSIBLE SCOOTER FOR USE AS AN ASSISTIVE MOBILITY DEVICE, each of which is hereby incorporated in its entirety including all tables, figures, and claims.

FIELD OF THE INVENTION

The present technology is a motorized scooter that can easily be collapsed for transport or storage. More specifically, it is motorized scooter with easy to lock and unlock joints between parts, that is highly stable, and has a front drive wheel for improved mobility on uneven or surfaces that give way.

BACKGROUND OF THE INVENTION

There are many people who require mobility aids. While large motorized scooters can be used for everyday use, they are not suitable for users who wish to transport them to different locations, or to store them in a small space. Smaller collapsible scooters have been developed to meet the needs of these people, but they suffer from many deficiencies, some which make them dangerous for the user.

One such device is disclosed in U.S. Pat. No. 7,207,407. It is directed to a collapsible three wheeled vehicle for personal transportation which has a removable support bracket that secures the distal ends of two independent foldable side rails at either end of the support bracket. The support bracket also provides a mounting base for a passenger seat. The rear support bracket, when removed, allows the side rails to fold together with the steering column for convenient storage. A removable front wheel, a removable seat, and removable steering handles allow the vehicle to further reduce the required amount of space for storage and transport. The vehicle uses a battery operated electric drive motor. A second optional battery power supply may be attached to the vehicle to extend its range. A storage bag is provided to hold the components of the vehicle when not in use. This scooter has many deficiencies, including poor stability, difficult to use locking mechanisms, a relatively large size even when collapsed, drive mechanism that is subject to wear, breakage, slipping and clogging and a need to be dismantled into parts in order to be collapsed.

Since U.S. Pat. No. 7,207,407 was filed, a family of patents directed to components for collapsible a motorized scooter was filed. U.S. Pat. No. 8,381,858 is directed to a handlebar folding mechanism and foldable motorized vehicle having same, U.S. Pat. No. 8,388,006 is directed to a motorized vehicle with foldable frame and locking mechanism, U.S. Pat. No. 8,388,014 is directed to a foldable motorized vehicle with frame connecting and frame locking mechanisms, U.S. Pat. No. 8,978,806 is directed to a telescopic frame, U.S. Pat. No. 8,746,730 is directed to a foldable frame for foldable motorized vehicle, and U.S. Pat. No. 8,413,753 is directed to a foldable seat mounting rack and foldable motorized vehicle having same. While these patents address approaches to fold a scooter, many use push pin locks, which are extremely difficult for many people to use. Further, they do not address the lack of stability that these scooters are known for.

U.S. Pat. No. 7,967,095 discloses a powered vehicle that has a rear frame assembly and a front frame assembly that are pivotally attached to one another, and can be pivoted from a normal fully-extended operating position to a folded position in which the frame assemblies are positioned substantially adjacent to one another, effectively reducing overall vehicle length to about half. One or more latch members lock the front and rear frame assemblies in the fully-extended, normal operating position, and they may be used to lock the frame assemblies in the folded position. The seat support structure may be integrated with the front and rear frame assemblies such that pivoting the frame assemblies toward the folded position collapses the seat support. The steering tiller may also be collapsible toward the front frame assembly. The rear wheels may be mounted on a transaxle that is pivotally mounted on the rear frame assembly. An extendable handle may be provided to assist in the folding operation and to tow the collapsed vehicle on its anti-tip rollers. While this device can be collapsed, it is still bulky. The frames are welded together, minimizing the amount that the device can be collapsed It has no braking system, nor does it have a speed controller, hence cannot be used without supervision.

U.S. Pat. No. 8,714,292 discloses a motorized wheeled chair assembly that facilitates movement by a person while seated on a chair. The assembly includes a frame and a plurality of wheels coupled to the frame. A seat and a motor are coupled to the frame. The motor is operationally coupled to one of the wheels defining a motorized wheel wherein the motor rotates the motorized wheel. A handle is coupled to the frame by an arm having a first end coupled to the handle and a second end removably coupled to the frame. A motor control is coupled to the handle and operationally coupled to the motor. As disclosed, this scooter would only be suitable for indoor use. The motor drives one of what appears to be one of four rear wheels. It has an exposed motor, exposed wiring and a belt drive. There is no braking system.

What is needed is a collapsible scooter that can be easily collapsed without dismantling it. It would be preferable if it was stable on a range of terrains. It would be of further advantage if the drive mechanism was protected from the ambient environment. It would be of further advantage if the drive mechanism was centred, to further increase stability and driveability. It would be of further advantage if the braking mechanism was suitable for stopping movement when ridden by a large person. It would be of further advantage if the collapsible scooter were robust yet light, allowing for easy storage and transport.

SUMMARY OF THE INVENTION

The present technology is a collapsible scooter that can be easily collapsed without dismantling it. It is stable on a range of terrains. The drive mechanism is protected from the ambient environment. The drive mechanism is centred and is front wheel drive, to further increase stability and driveability. A disc braking system is used to ensure that the scooter is better able to stop when ridden by a large person. The braking is also balanced, with two back brake. This improves stability and ease of braking. The connections between the controls and the brakes are substantially routed through the tubing which makes up the framework of the scooter. The scooter is robust and light weight, allowing for easy storage and transport.

In one embodiment, a collapsible motorized scooter for use with a battery is provided, the motorized scooter comprising: a front wheel in rotatably engagement with a steering tube; an electric hub motor housed in the front wheel; a handle bar distally attached to the steering tube; a framework, the framework including a plurality of tubes that are in one or more of pivotal or slidable relation; a seat post slidably mounted on the framework; a seat attached to the seat post; and a pair of rear wheels in rotatable engagement with the framework.

In the scooter, the steering tube may include an upper steering tube, a lower steering tube, a lower steering tube housing and a locking hinge pivotally attaching the upper steering tube to the lower steering tube.

The scooter may further comprise a braking system.

In the scooter, the braking system may be a mechanically or hydraulically actuated disc braking system.

In the scooter, the braking system may include a disc on each rear wheel.

In the scooter, the framework may include a junction, a pair of front legs pivotally mounted on the junction, a pair of rear legs pivotally mounted on the junction, and a left and a right frame, the left and the right frame pivotally mounted on the steering tube housing, the front legs pivotally and slidably mounted on the left and the right frame, the rear legs pivotally mounted on the left and the right frame.

In the scooter, the seat may include a collapsible seat back.

The scooter may further comprise a throttle control.

The scooter may further comprise a controller, the controller in electronic communication with the throttle control and electrical communication with the motor.

In the scooter, the throttle control may be in wireless communication with the controller.

The scooter may further comprise a hanger, the hanger attached to the lower steering tube housing.

The scooter may further comprise an outer seat tube with a quick release mechanism mounted thereon for slidably and lockably retaining the seat post, the outer seat tube attached to the junction.

The scooter may further comprise a right and a left foot rest pivotally mounted on the right and the left frame.

The scooter may further comprise the battery.

In another embodiment, a collapsible motorized scooter for use as an assistive mobility aid is provided, the motorized scooter comprising: a steering tube; a front fork attached distally to the steering tube; a front wheel including a hub and a plurality of spokes, the front wheel rotatably attached to the front fork; a left frame and a right frame, the left frame and the right frame pivotally mounted to the steering tube; a left rear wheel and a right rear wheel, the rear wheels rotatably attached to the respective frame; a right handle bar and a left handle bar, the right handlebar and the left handle bar attached to the steering tube at a proximal end; a junction; an outer seat tube attached to the junction and extending therefrom; a seat including a seat frame and a seat post, the seat post slidably mounted in the outer seat tube; a pair of front legs pivotally and slidably attached to the frames distally, and to the junction proximally; a pair of rear legs pivotally attached to the frames distally and to the junction proximally; and a motor drive assembly, the motor drive assembly including an electric motor housed within the hub of the front wheel and a cog attached thereto, engaging the plurality of spokes of the front wheel.

The scooter may further comprise a braking system including disc brakes on the rear wheels.

In the scooter, the seat may include a collapsible seat back.

The scooter may further comprise a throttle control.

In the scooter, the throttle control may be mounted on a handlebar.

The scooter may further comprise a controller, the controller in electronic communication with the throttle control and electrical communication with the motor.

In the scooter, the throttle control may be in wireless communication with the controller.

In the scooter, the outer seat tube may include a quick release mechanism mounted thereon for slidably and lockably retaining the seat post, the outer seat tube attached to the junction.

In the scooter, the steering tube may include an upper steering tube, a lower steering tube, a lower steering tube housing and a locking hinge pivotally attaching the upper steering tube to the lower steering tube The scooter may further comprise a hanger, the hanger attached to the lower steering tube housing.

The scooter may further comprise a right and a left foot rest pivotally mounted on the right and the left frame.

The scooter may further comprise the battery.

In another embodiment, a method of preparing a collapsed, motorized scooter for use is provided, the motorized scooter comprising: a front wheel in rotatably engagement with a lower steering tube, the front wheel including a hub motor; an upper steering tube hinged to the lower steering tube, a handle bar distally attached to the upper steering tube; a framework, the framework including a plurality of tubes that are in a pivotal or pivotal and slidable relation; a seat post slidably mounted on the framework; a seat attached to the seat post; a seat back hinged to the seat; and a pair of rear wheels in rotatable engagement with the framework, the method comprising pivoting the tubes of the framework that are in pivotal relation and sliding and pivoting the tubes of the framework that are in a pivotal and slidable relation, locking the framework, pivoting and locking the upper steering tube to the lower steering tube and pivoting the seat back to an upright position.

The method may further comprise raising the seat post.

The method may further comprise pivoting a pair of foot rests hinged to the framework outward.

In another embodiment, a method of preparing a motorized collapsible scooter for storage is provided, the scooter comprising a front wheel in rotatably engagement with a lower steering tube, the front wheel including a hub motor; an upper steering tube hinged to the lower steering tube, a handle bar distally attached to the upper steering tube; a framework, the framework including a plurality of tubes that are in a pivotal or pivotal and slidable relation; a seat post slidably mounted on the framework; a seat attached to the seat post; a seat back hinged to the seat; and a pair of rear wheels in rotatable engagement with the framework, the method comprising unlocking the framework, pivoting the tubes of the framework that are in pivotal relation and sliding and pivoting the tubes of the framework that are in a pivotal and slidable relation, unlocking and pivoting the upper steering tube from the lower steering tube and pivoting the seat back to a lowered position.

The method may further comprise lowering the seat post.

The method may further comprise pivoting a pair of foot rests hinged to the framework inward.

The method may further comprise hanging the scooter.

DETAILED DESCRIPTION OF THE INVENTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
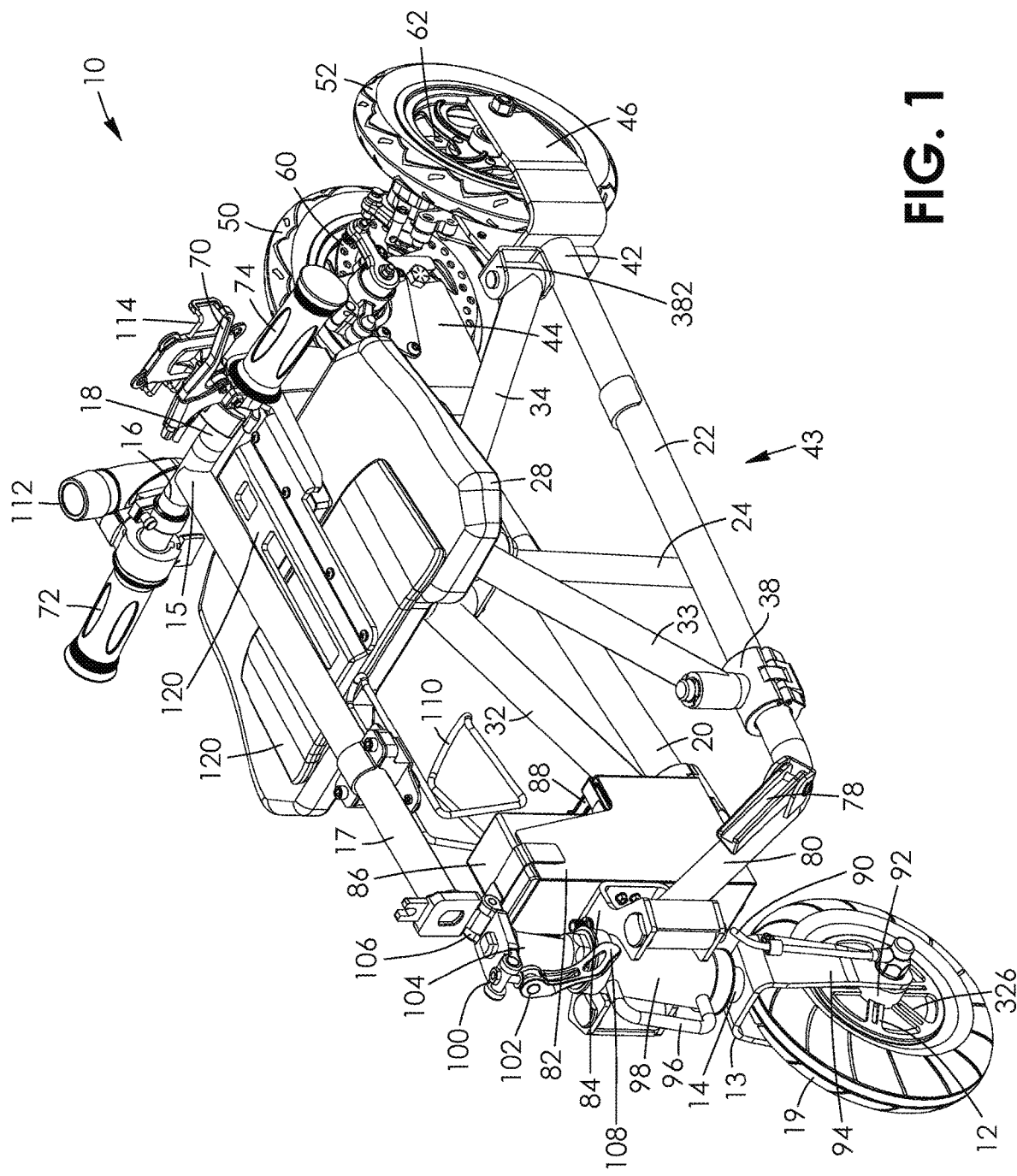
FIG. 1 is a perspective view of the motorized collapsible scooter of the present technology in the folded or storage position.
Figure 2:
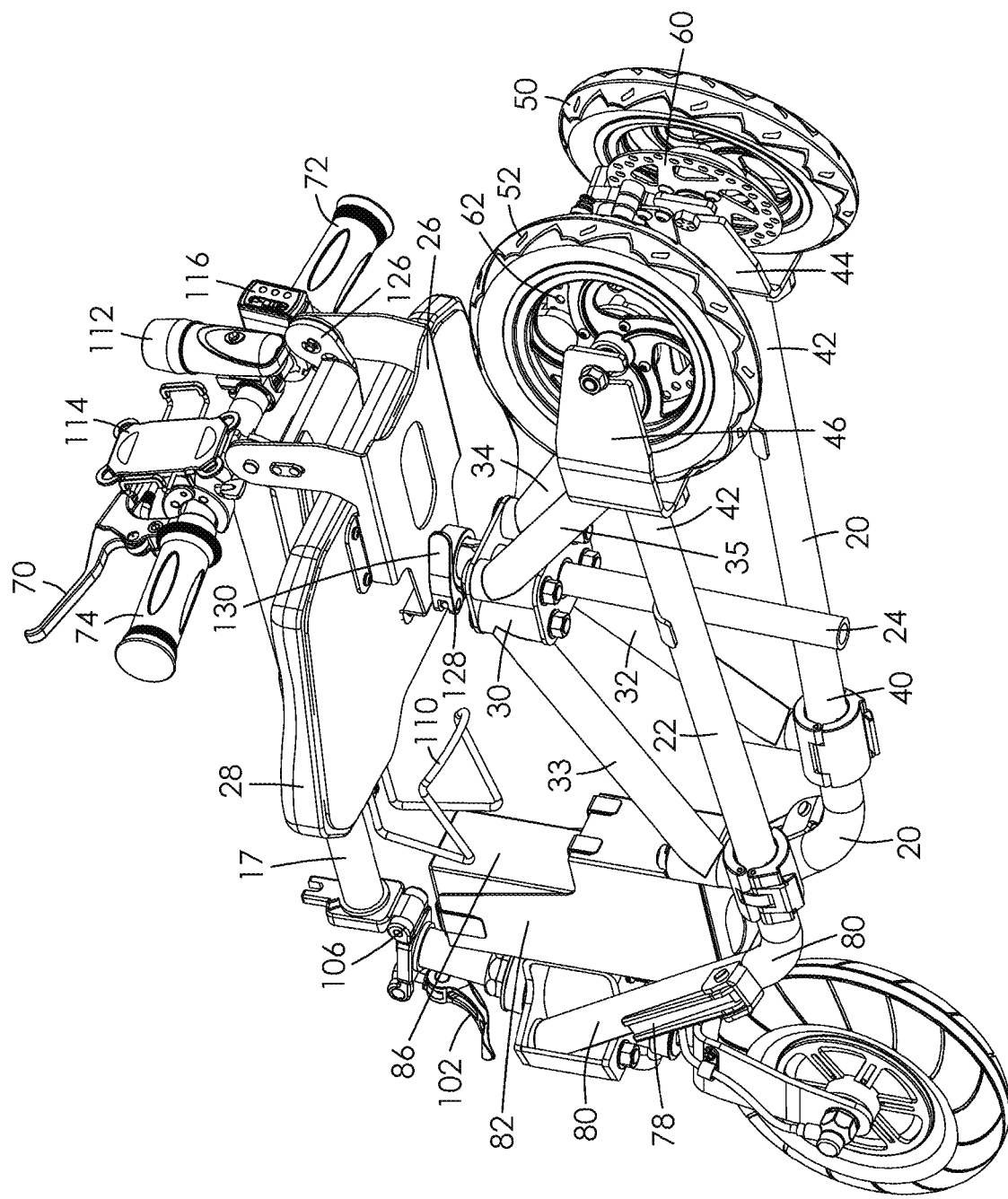
FIG. 2 is another perspective view of the scooter of FIG. 1 in the folded or storage position.
Figure 3:
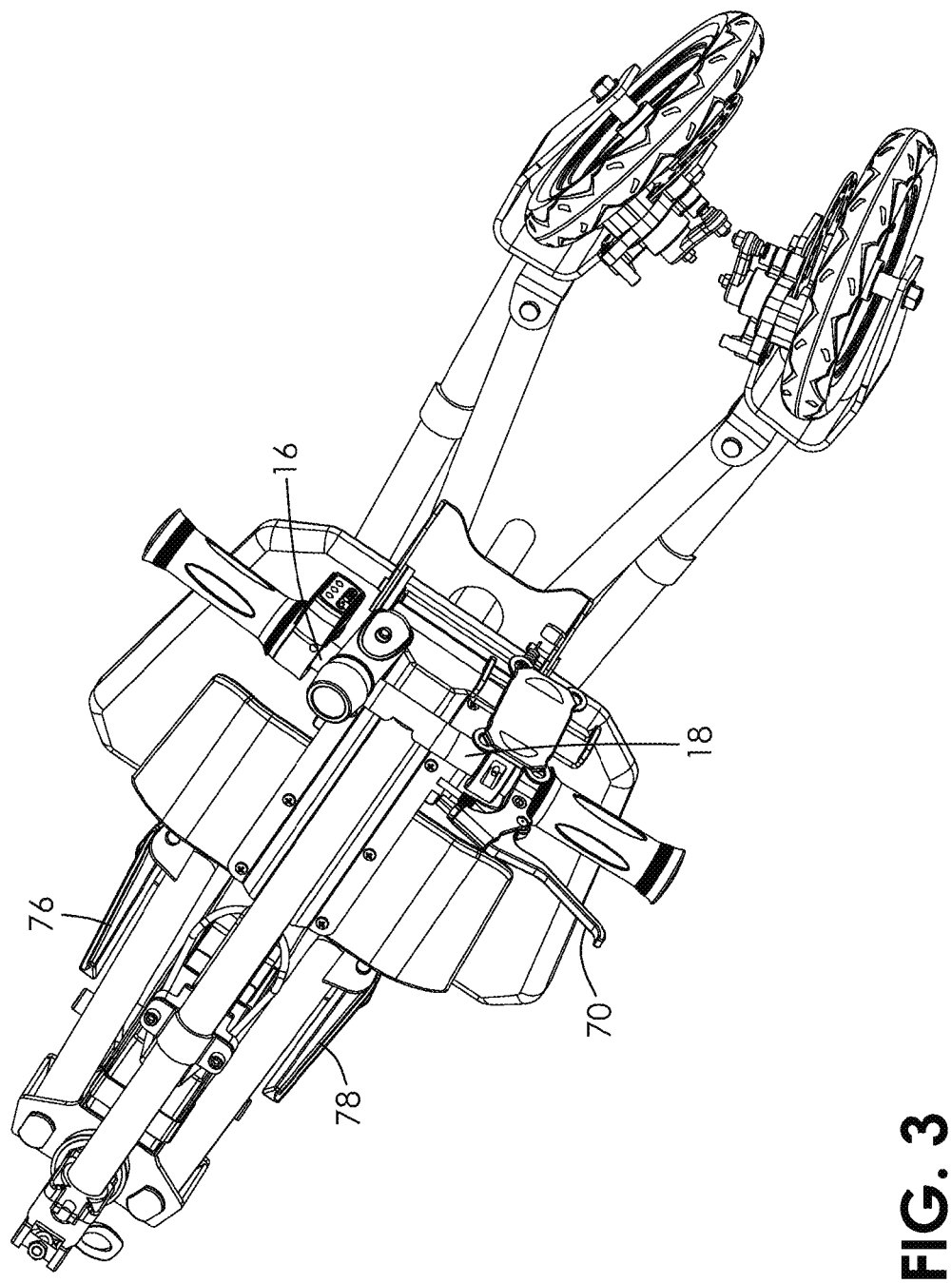
FIG. 3 is a top rear perspective view of the scooter of FIG. 1 in the folded or storage position.

A motorized scooter, generally referred to as 10 is shown in FIGS. 1, 2 and 3, in the retracted position. The scooter 10 has a front wheel 12 rotatably attached to the distal end 13 of a lower steering tube 14, a right handle bar 16, a left handle bar 18, both pivotally attached to the proximal end 15 of the upper steering tube 17. A right frame 20, and a left frame 22 extend from and are attached to the lower steering tube 14 in a vicinity of the distal end 13. A seat post 24 is attached to a seat frame 26, and retains the seat 28. The seat post 24 is slidably located in a junction 30. A pair of front legs (right and left) 32, 33 and a pair of rear legs (right and left) 34, 35 are attached to the junction 30 and extend downward to the right frame 20 and the left frame 22. The front legs 32, 33 are pivotally and slidably connected to their respective frame 20, 22 in the mid section 40 with a sliding pivot 38. The rear legs 34, 35 are pivotally connected proximate the distal end 42 of their respective frame 20, 22. The right and left frames 20, 22, the front and rear legs 32, 33, 34, 35 and junction 30 form the framework, generally referred to as 43. A right fork 44 is attached to the distal end 42 of the right frame 20 and a left fork 46 is attached to the distal end 42 of the left frame 22. A right rear wheel 50 and left rear wheel 52 are releasably and rotatably attached to their respective right fork 44 and left fork 46. A right rear disc 60 and a left rear disc 62, which are part of the rear disc brake system, are mounted with their respective wheels 50, 52. The wheels 12, 50, 52 have tires 19, which may be solid or pneumatic.

The left handle bar 18 has a rear brake lever 70. Both handle bars 16, 18 have hand grips 72, 74. Foot rests 76, 78 are pivotally attached to the right and left frame 20, 22 (FIGS. 1 and 3) on the angled section 80. A battery holder 82 is located behind the lower steering tube 14 and is attached to the lower steering tube 14 with a bracket 84. The battery 86 sits in the battery holder 82. A controller 88 is also housed in the battery holder 82. A motor cable 90 is attached to the motor drive assembly 92 at one end and is fed through the battery holder 82 at the other end (details of the electrical connection and controller connection are described below). Part of the motor drive assembly 92 can be seen located between the front wheel 12 and the front fork 94. The front fork 94 rotatably retains the front wheel 12 and is attached to the lower steering tube 14 proximally. A hanger 96 is attached to the lower steering tube housing 98 for hanging the scooter 10 up when not in use.

A hinge lock 100 with a quick release mechanism 102 is attached to the top end 104 of the lower steering tube 14. A hinge 106 joins the lower steering tube 14 to the upper steering tube 17. The quick release lever 108 assists users that have reduced hand strength and dexterity.

A drink holder 110 is attached to the upper steering tube 17.

The handlebars 16, 18 have a safety light 112 and a cell phone holder 114 attached to them. The right handle bar 16 has a thumb throttle controller 116 attached to it.

An adjustable seat back frame 122, which adjustable retains the seat back 120 is pivotally attached to the seat frame 26 with a pair of hinges 126.

An outer seat tube 128 is joined to the junction 30. It has a quick release mechanism 130 attached to it for allowing the seat post 24 to be raised, lowered and locked in place. A quick release mechanism may also be provided on the upper steering tube 17, hence the upper steering tube 17 includes a telescoping inner tube and an outer tube.

Figure 4:
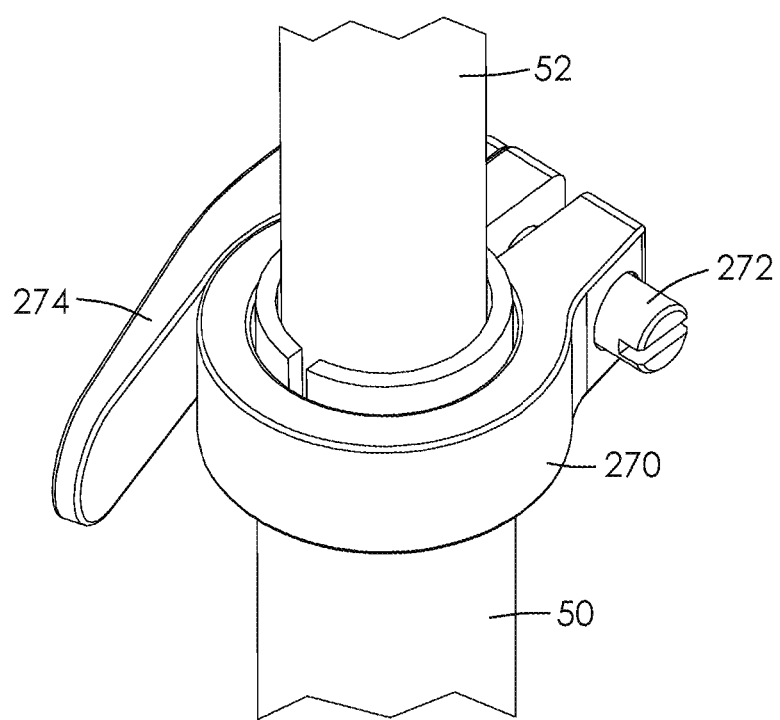
FIG. 4 is a side view of the quick release mechanism of the scooter of FIG. 1.

The details of the quick release mechanisms are shown in FIG. 4. These allow for adjustment of both the seat height and the handlebar height. A c-clamp 270 with a clamp bolt 272 and a quick release lever 274 is used. The c-clamp 270 is tightened with the clamp bolt 272. The quick release lever 274 assists users that have reduced hand strength and dexterity.

Figure 5:
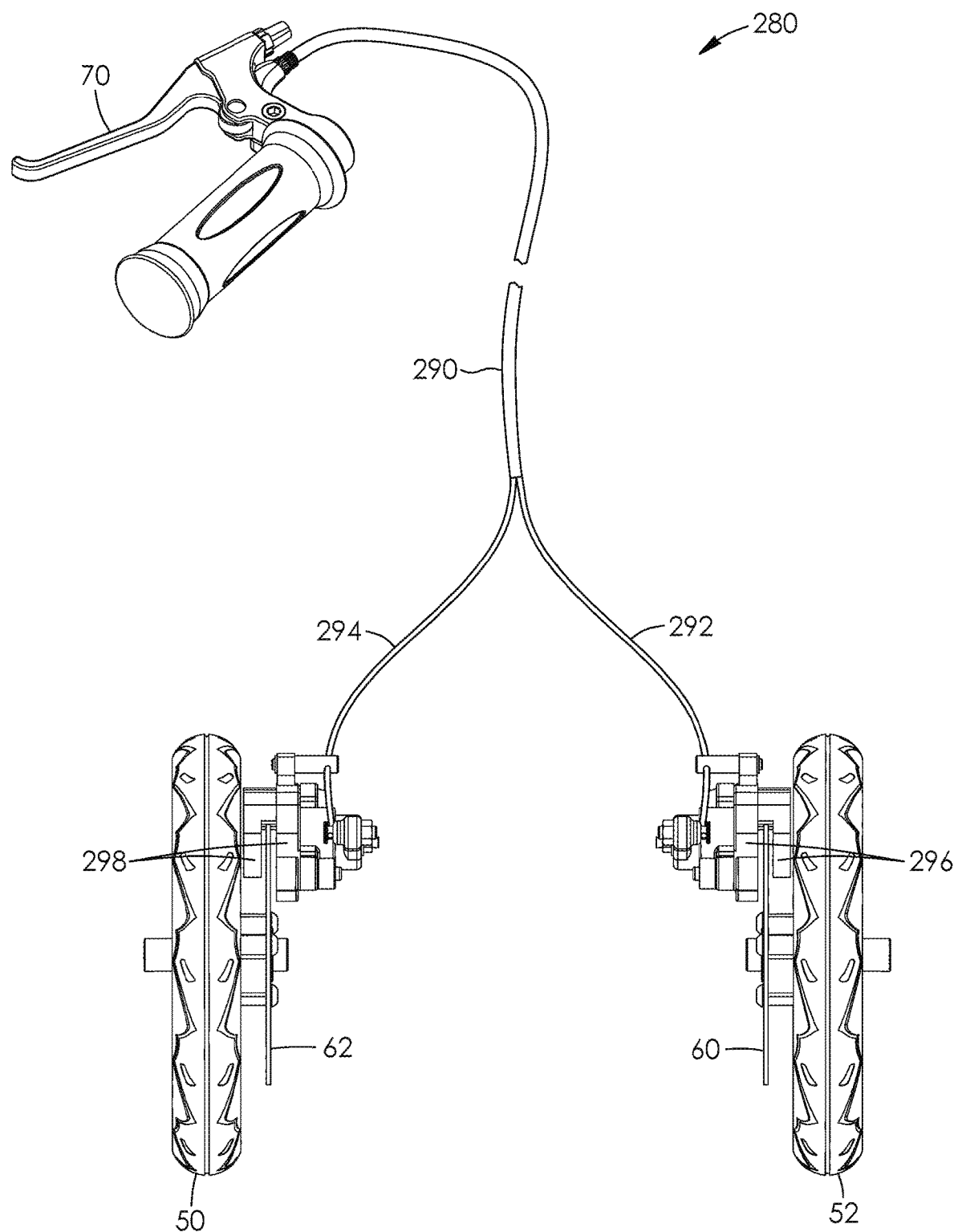
FIG. 5 is a schematic of the braking system of the scooter of FIG. 1.

As shown in FIG. 5, the braking system, generally referred to as 280, has a rear brake lever 70, a rear brake line 290 that splits into a right rear brake line 292, and a left rear brake line 294, a pair of right rear brake pads 296, a pair of left rear brake pads 298, a right rear brake disc 60 and a left rear brake disc 62. The brake lines 290, 292, 294 in one embodiment are hydraulic lines. In another embodiment, the brake lines 290, 292, 294 are mechanical brake lines. As would be known to one skilled in the art, the brake discs 60, 62 are mounted on the wheels 50, 52 and the brake pads 296, 298 are located on either side of the discs 60, 62. The brake lines 290, 292, 294 are substantially housed within the tubing of the frames 20, 22 and tubes 14, 17.

Figure 6:
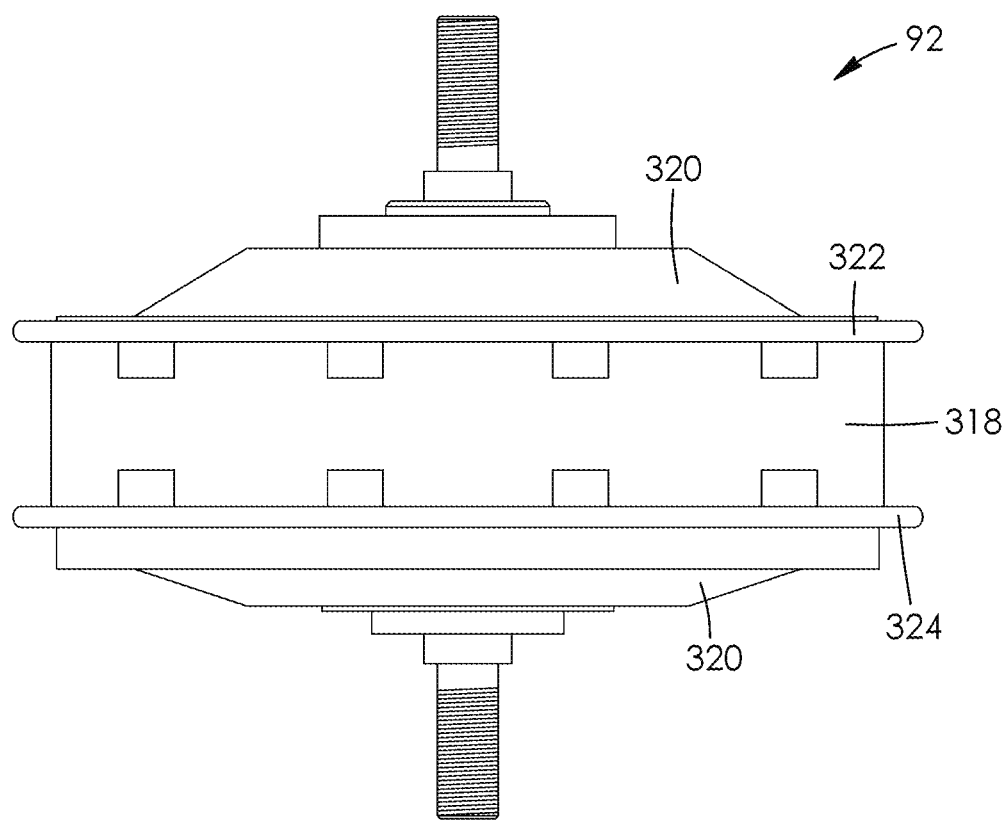
FIG. 6 is a sectional view of the motor drive assembly of the scooter of FIG. 1.

As shown in FIG. 6, the motor drive assembly, generally referred to as 92 has an electric motor 318 that is housed within the wheel hub 320, and a right and left cog 322, 324 in rotatable engagement with the motor 318 to transfer the motive force to the front wheel 12. As shown in FIG. 1, the right and left cog 322, 324 engage the spokes 326 of the front wheel 12 to drive the front wheel 12. The wheel hub motor has no belts, cables or chains, thus reducing the chance of slippage or failure. The throttle control is preferably wireless for example, a wireless radio system, which is part of the controller 88. As shown in FIG. 2, the motor 318 is in electrical communication with the battery 86 via the motor cable 90. The battery 86 is preferably a rechargeable lithium battery. The battery 86 is removable.

Figure 7:
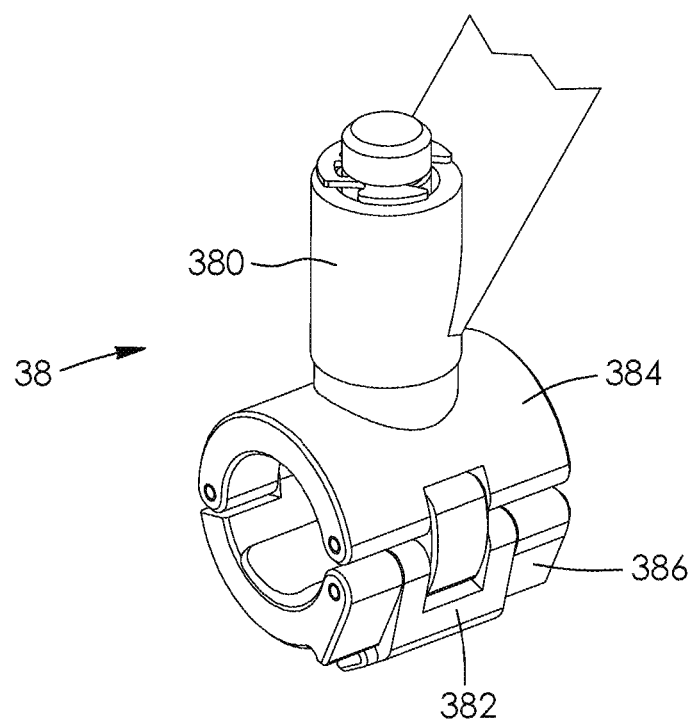
FIG. 7 is side view of the slidably pivot of the scooter of FIG. 1.

The details of the slidable, pivoting joint 38 between the front legs 32,33 and the frames 20, 22 are shown in FIG. 7. A hinge 380 is attached and is normal to a c-clamp 382 with a clamp bolt 384 and a lever 386. The front legs 32, 33 are attached to the hinge 380 at their distal ends 388, 390. Thus, when the c-clamp is released, the front legs can move along the length of the frames 20, 22 and can articulate about the hinge 380. As shown in FIG. 1, using the left rear leg 34 as an example, a hinge 382 pivotally attaches the rear left leg 34 to the distal end 42 of the left frame 22 at the distal end 394 of the rear left leg 34. The same arrangement occurs on the rear right leg 32.

Figure 8:
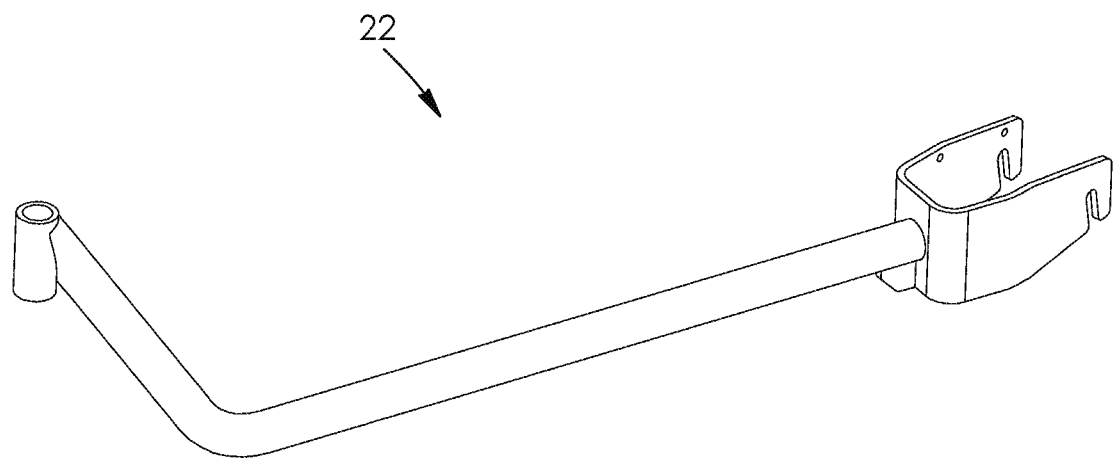
FIG. 8 is a side view of the left frame of the scooter of FIG. 1.

The left frame 22 is shown in FIG. 8. The frames are made of tubular sections, which, in the preferred embodiment, are carbon fibre tubing.

The seat 28 has an outer water resistant coating, and an inner layer with a Shore durometer rating of about 15 to 30 on the OO scale.

Figure 9:
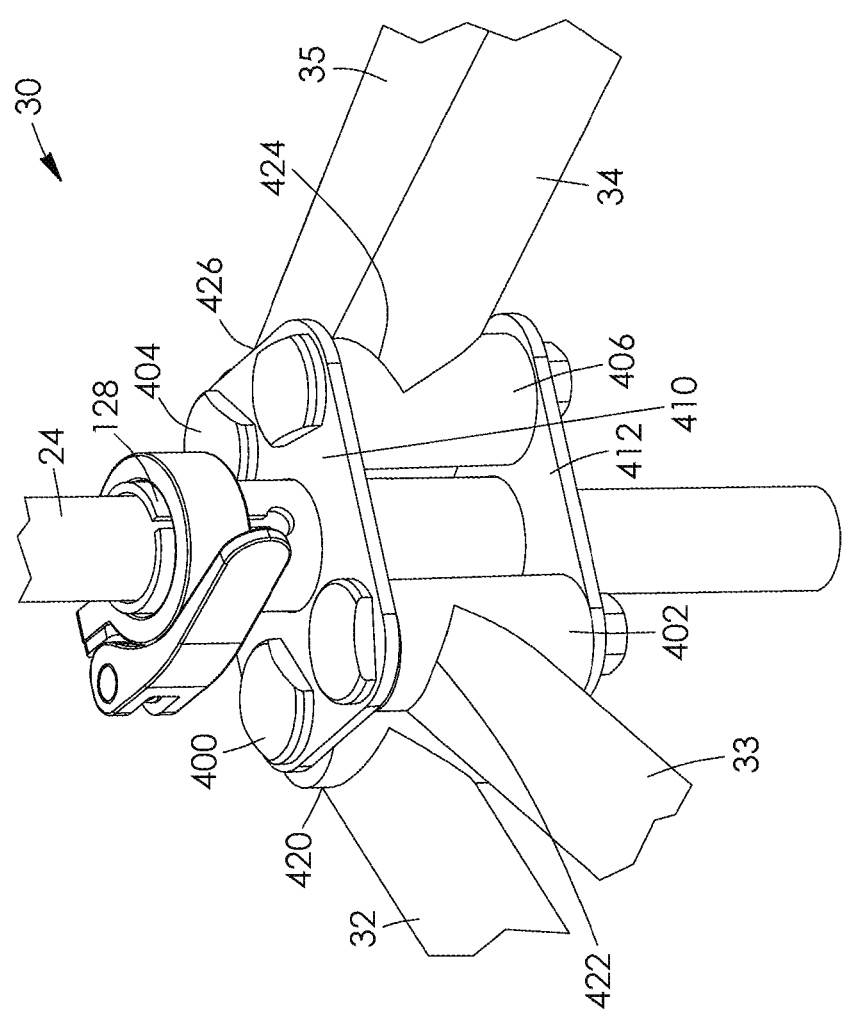
FIG. 9 is perspective view of the junction of the scooter of FIG. 1.

As shown in FIG. 9, the junction 30 has four hinges 400, 402, 404 and 406 mounted between an upper plate 410 and a lower plate 412. As noted above, an outer seat tube 128 is mounted on the junction 30 for slidable engagement of the seat tube 24. The left and right front hinges 400, 402 pivotally attach the left and right front legs 33,32 to the junction 30 at their proximal ends 420, 422. Similarly, the left and right rear hinges 404, 406 pivotally attach the left 34 and right rear legs 35 to the junction 30 at their proximal ends 424, 426.

Figure 10:
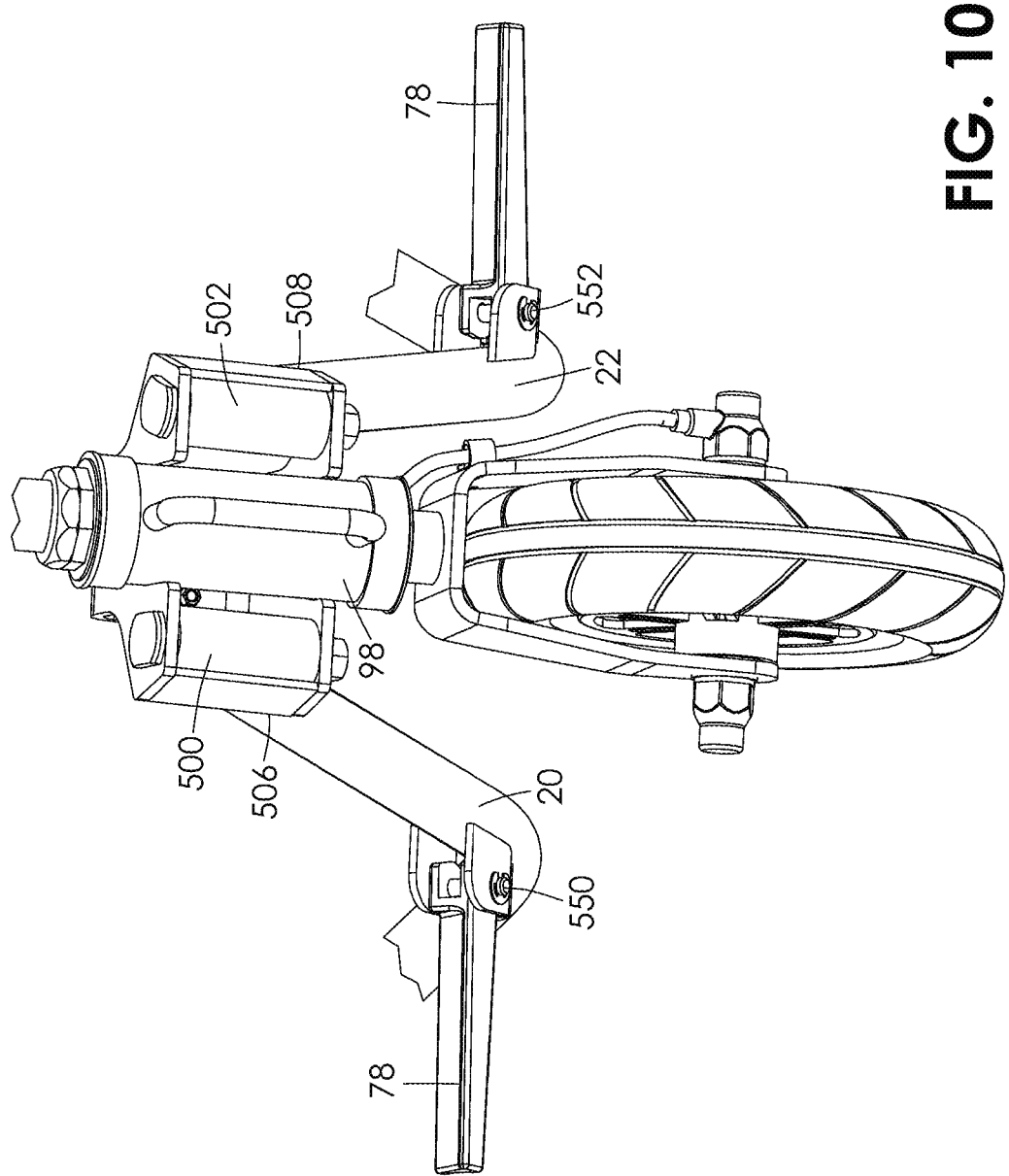
FIG. 10 is a perspective view of the front pivot joints and foot rests of the scooter of FIG. 1.

As shown in FIG. 10, the front pivots are hinges 500, 502 pivotally attach the right frame 20 and left frame 22 to the lower steering tube housing 98 at their proximal ends 506, 508.

As shown in FIG. 10, hinges 550, 552 pivotally attach the foot rests 78 to the right and left frame 20, 22.

In an alternative embodiment, the right handlebar 600 and left handlebar 602 are pivotally mounted on a central bar 604, which in turn is mounted on the distal end 606 of the upper steering tube 608. This is referred to as the handlebars being in pivotal relation with the upper steering tube. A locking mechanism 610 prevents them from coming undone when in use. The front right leg 612 and the front left leg 614 are mounted on the right frame 616 and the left frame 618, respectively. The right rear leg 620 and the left rear leg 622 are mounted on the right frame 616 and the left frame 618, respectively.

In another embodiment, the right handlebar 600 and left handlebar 602 are pivotally mounted on the distal end 606 of the upper steering tube 608. This is referred to as the handlebars being in pivotal relation with the upper steering tube. A locking mechanism 610 prevents them from coming undone when in use.

The combination of the quick release mechanisms and other locking an releasing mechanisms, the hinges and the pivot joint allow: the upper steering tube 17 to fold towards the rear of the scooter 10; the right and left frames 20, 22, to fold inward towards themselves; the seat back frame 122 to fold towards the front of the scooter 10 and rest on the seat 28; the foot rests 78 to fold inward; and the handlebars to fold forwards. Lowering the seat post 24 further compacts the scooter 10. No parts need to be removed in order to fold the scooter, hence there is little opportunity to lose parts. The scooter 10 can then be hung from the hanger 96 for storage or transportation, hence it is portable.

Figure 11:
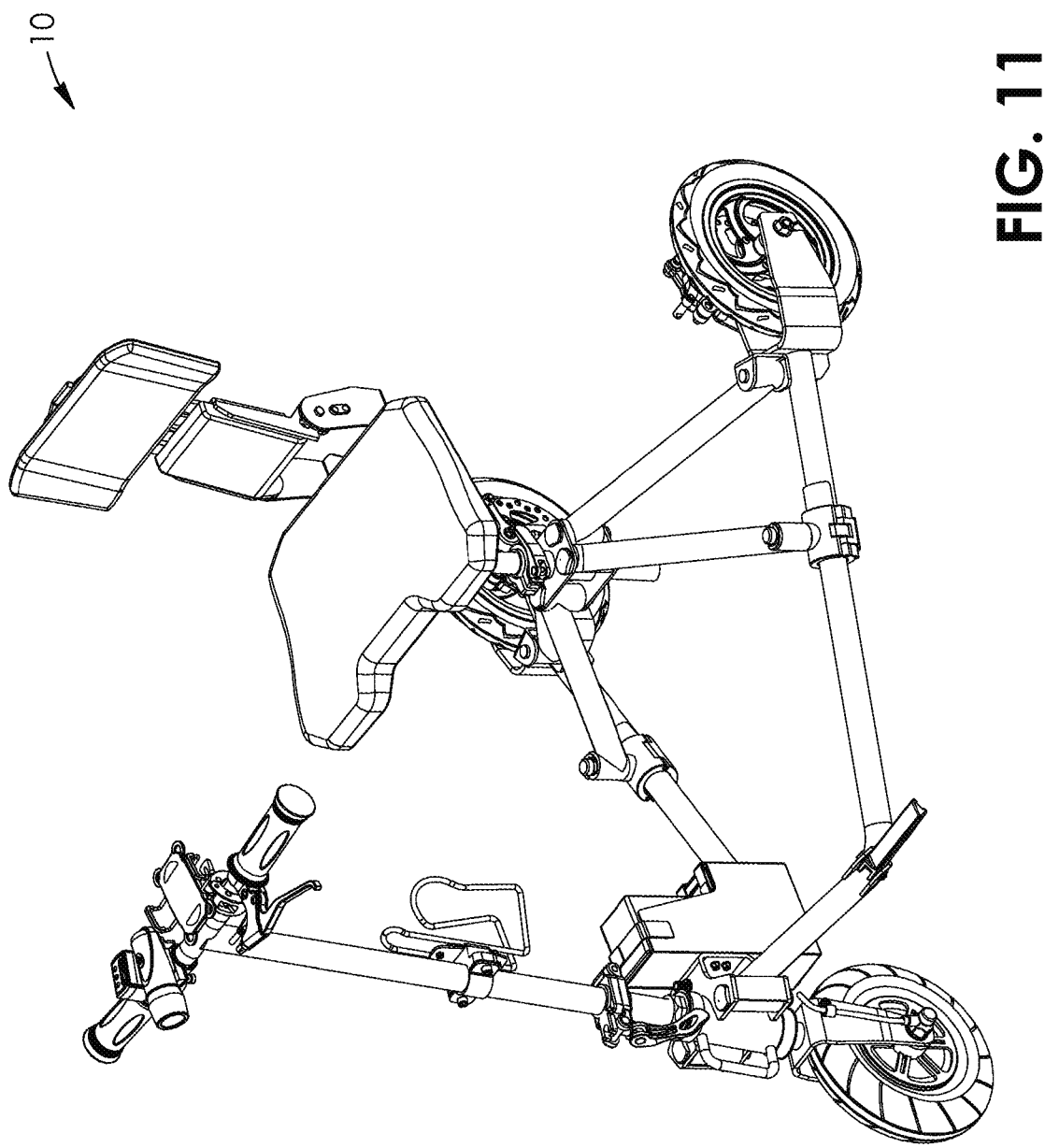
FIG. 11 is a perspective view of the scooter in the expanded or driving position.

FIG. 11 shows the scooter 10 in the driving position.

While the particular device has been illustrated and described in detail with the help of drawings and foregoing descriptions, such an illustration and description is to be considered as exemplary and not restrictive in character, and is to be understood that it is the presently preferred embodiments of the present technology and is thus representative of the subject matter which is broadly contemplated by the present technology, and that all changes and modifications that come within the spirit of the disclosure are desired to be protected.

The invention claimed is:

1. A collapsible motorized scooter for use with a battery, the motorized scooter comprising: a front wheel in rotatably engagement with a steering tube housed in a steering tube housing; an electric hub motor housed in the front wheel; a handle bar distally attached to the steering tube; a framework, wherein the framework includes a junction which includes four vertically disposed hinges, a pair of front legs laterally pivotally mounted on the junction, each on one of the vertically disposed hinges, a pair of rear legs laterally pivotally mounted on the junction, each on one of the vertically disposed hinges, and a left and a right frame, the left and the right frame pivotally mounted on the steering tube housing, the front legs pivotally and slidably mounted on the left and the right frame, the rear legs mounted on the left and the right frame; a seat post slidably mounted on the framework; a seat attached to the seat post; and a pair of rear wheels in rotatable engagement with the framework.

2. The collapsible motorized scooter of claim 1, wherein the seat includes a collapsible seat back.

3. The collapsible motorized scooter of claim 2 further comprising a throttle control.

4. The collapsible motorized scooter of claim 3 further comprising a controller, the controller in electronic communication with the throttle control and electrical communication with the motor.

5. The collapsible motorized scooter of claim 4, wherein the throttle control is in wireless communication with the controller.

6. The collapsible motorized scooter of claim 1, further comprising vertically disposed hinges proximate a distal end of the right and the left frame, the rear legs laterally pivotally mounted on the right and the left frame with the vertically disposed hinges.

7. The collapsible motorized scooter of claim 6, further comprising vertically disposed hinges on the steering tube housing, a proximal end of each of the right and the left frame laterally pivotally mounted on the steering tube housing with the vertically disposed hinges.

8. The collapsible motorized scooter of claim 7, further comprising a mechanically or hydraulically actuated disc braking system including a right rear disc and a left rear disc mounted on the rear wheels.

9. The collapsible motorized scooter of claim 7, further comprising hinges which are attached to the front legs and are vertically disposed and c-clamps which are normal to the hinges, are attached to the hinges and are slidably mounted on the right and the left frames.

10. A collapsible motorized scooter for use as an assistive mobility aid, the motorized scooter comprising: a steering tube; a front fork attached distally to the steering tube; a front wheel including a hub and a plurality of spokes, the front wheel rotatably attached to the front fork; a left frame and a right frame, the left frame and the right frame in pivotal relation with the steering tube; a left rear wheel and a right rear wheel, the rear wheels rotatably attached to the respective frame; a right handle bar and a left handle bar, the right handlebar and the left handle bar in pivotal relation with the upper steering tube; a junction which includes four vertically disposed hinges; an outer seat tube attached to the junction and extending therefrom; a seat including a seat frame and a seat post, the seat post slidably mounted in the outer seat tube; a pair of front legs pivotally and slidably mounted on attached to the frames distally, and pivotally attached to the junction proximally each on one of the vertically disposed hinges; a pair of rear legs attached to the frames distally and pivotally attached to the junction proximally each on one of the vertically disposed hinges; and a motor drive assembly, the motor drive assembly including an electric motor housed within the hub of the front wheel and a cog attached thereto, engaging the plurality of spokes of the front wheel.

11. The collapsible motorized scooter of claim 10, further comprising a braking system including discs on the rear wheels.

12. The collapsible motorized scooter of claim 11, further comprising a hanger, the hanger attached to a lower steering tube housing.

13. The collapsible motorized scooter of claim 10, further comprising vertically disposed hinges proximate a distal end of the frames, the rear legs laterally pivotally mounted on the frames with the vertically disposed hinges.

14. The collapsible motorized scooter of claim 13, further comprising vertically disposed hinges on the lower steering tube housing, a proximal end of the frames laterally pivotally mounted on the steering tube housing with the vertically disposed hinges.

15. The collapsible motorized scooter of claim 14, further comprising hinges which are attached to the front legs and are vertically disposed and c-clamps which are normal to the hinges, are attached to the hinges and are slidably mounted on the frames.

16. A method of preparing a collapsed, motorized scooter for use, method comprising: i) a user selecting a motorized scooter including: a front wheel in rotatably engagement with a lower steering tube, which is housed in a lower steering tube housing, the front wheel including a hub motor; an upper steering tube hinged to the lower steering tube; a right handle bar and a left handle bar, the right handlebar and the left handle bar in pivotal relation with the upper steering tube; a framework, wherein the framework includes a junction, which includes four vertically disposed hinges, a pair of front legs laterally pivotally mounted on the junction, each on one of the vertically disposed hinges, a pair of rear legs laterally pivotally mounted on the junction, each on one of the vertically disposed hinges, and a left and a right frame, the left and the right frame pivotally mounted on the lower steering tube housing, the front legs pivotally and slidably mounted on the left and the right frame, the rear legs mounted on the left and the right frame; a seat post slidably mounted on the framework; a seat attached to the seat post; a seat back hinged to the seat; and a pair of rear wheels in rotatable engagement with the framework ii) pivoting the tubes of the framework that are in pivotal relation; iii) locking the framework; iv) pivoting and locking the upper steering tube to the lower steering tube; v) pivoting and locking the right handle bar and the left handle bar; vi) and pivoting and locking the seat back to an upright position.

17. The method of claim 16, further comprising raising the seat post.

18. The method of claim 17 further comprising pivoting a pair of foot rests hinged to the framework outward.

19. The method of claim 18, further comprising; vii) preparing the motorized collapsible scooter for storage by unlocking the framework, pivoting the tubes of the framework that are in pivotal relation, unlocking and pivoting the upper steering tube from the lower steering tube and pivoting the seat back to a lowered position.

\* \* \* \* \*